United States Patent
Al-Salameh et al.

(10) Patent No.: US 6,614,567 B1
(45) Date of Patent: Sep. 2, 2003

(54) APPARATUS AND METHOD FOR UPGRADING THE CAPACITY OF WAVELENGTH DIVISION MULTIPLEXED OPTICAL NETWORKS

(75) Inventors: Daniel Yousef Al-Salameh, Marlboro, NJ (US); Wenhua Lin, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/143,879

(22) Filed: Aug. 31, 1998

(51) Int. Cl.$^7$ ................................................ H04J 14/02
(52) U.S. Cl. ...................................... 359/124; 359/127
(58) Field of Search ................................. 359/130, 124, 359/341, 110, 122, 24, 127

(56) References Cited

U.S. PATENT DOCUMENTS

| | | | | |
|---|---|---|---|---|
| 5,377,035 A | * | 12/1994 | Wang et al. | 359/156 |
| 5,500,756 A | * | 3/1996 | Tsushima et al. | 359/174 |
| 5,583,683 A | | 12/1996 | Scobey | 359/127 |
| 5,696,614 A | * | 12/1997 | Ishikawa et al. | 359/124 |
| 5,914,794 A | * | 6/1999 | Fee et al. | 359/110 |
| 6,023,366 A | * | 2/2000 | Kinoshita | 359/341 |
| 6,038,357 A | * | 3/2000 | Pan | 385/24 |
| 6,043,914 A | * | 3/2000 | Cook et al. | 359/124 |
| 6,049,417 A | * | 4/2000 | Srivastava | 359/341 |
| 6,094,442 A | * | 7/2000 | Okamoto et al. | 370/506 |
| 6,104,527 A | * | 8/2000 | Yang | 359/341 |
| 6,122,096 A | * | 9/2000 | Fatehi | 359/341 |
| 6,134,033 A | * | 10/2000 | Bergano et al. | 359/122 |

* cited by examiner

Primary Examiner—Leslie Pascal
Assistant Examiner—Christina Y. Leung
(74) Attorney, Agent, or Firm—Gregory J. Murgia (57) ABSTRACT

An optical filter/combiner arrangement is used for filtering and combining optical signals in at least two wavelength bands supplied by at least two respective Wavelength Division Multiplexed (WDM) systems along the same optical fiber. More specifically, optical signals received by the optical filter/combiner arrangement from an optical fiber are appropriately filtered so that optical signals in one wavelength band are processed by components of one WDM system and optical signals in another wavelength band are processed by components in another WDM system. After processing by the respective WDM system components, the optical signals in each of the wavelength bands are then re-combined and supplied along the same optical fiber. By using the optical filter/combiner arrangement, existing WDM systems can be upgraded to higher capacity using the existing optical fiber and without replacing existing components or disrupting existing service.

10 Claims, 8 Drawing Sheets

APPARATUS AND METHOD FOR UPGRADING THE CAPACITY OF WAVELENGTH DIVISION MULTIPLEXED OPTICAL NETWORKS

FIELD OF THE INVENTION

This invention relates generally to lightwave communication networks and, more particularly, to increasing the capacity of Wavelength Division Multiplexed (WDM) networks.

BACKGROUND OF THE INVENTION

Wavelength Division Multiplexing (WDM) increases the capacity of lightwave communication systems by multiplexing many optical channels of different wavelengths for transmission as a composite signal in an optical fiber. At present, most WDM systems deployed in communication networks are generally considered to be low capacity systems, e.g., 4, 8, and 16-channel systems. With recent advances in optical networking technology, WDM system manufacturers are now contemplating systems having as many as 80 channels, for example. Although these higher capacity systems will help service providers in meeting the increasing demand for more bandwidth, service providers are also demanding cost-effective solutions for increasing the capacity of existing WDM systems while preserving the investments already made in these existing WDM systems.

Optical amplifiers, such as erbium doped fiber optical amplifiers, are important components in a WDM system. Unfortunately, most optical amplifiers used in existing WDM systems are limited in terms of usable gain bandwidth and, as a result, have limited utility for the emerging high capacity systems. Consequently, to increase the capacity of an existing WDM system, i.e., by adding more channels, a service provider generally must choose between the complete replacement of the existing lower capacity system with a higher capacity system or the installation of a second WDM system to operate in parallel with the existing WDM system.

In some cases, service providers are reluctant to completely replace existing systems with higher capacity systems because discarding existing equipment sacrifices a significant part of their initial investment. Moreover, a complete replacement would result in some system downtime during the replacement. Although a second WDM system installed to operate in parallel with the existing WDM system increases the overall system capacity from terminal to terminal, this option requires additional optical fiber which may not be available or may be too costly to install.

SUMMARY OF THE INVENTION

The costs and operational downtime associated with upgrading the capacity of existing WDM systems can be substantially reduced according to the principles of the invention with an optical filter/combiner arrangement that routes optical channels in two or more wavelength bands supplied by two or more WDM systems in the same optical fiber. The optical filter/combiner arrangement separates selected ones of the optical channels from each WDM system and supplies the separated optical channels to respective optical components in each of the WDM systems. After processing by the respective optical components, the optical channels are re-combined for simultaneous transmission in the same optical fiber. By simultaneously accommodating optical channels supplied by each of the WDM systems in the same optical fiber, a service provider can upgrade a first system to include optical channels from at least a second system without installing additional optical fiber and without discarding the existing WDM system.

In one illustrative embodiment, the optical filter/combiner arrangement includes a filter portion that receives a composite signal comprising optical channels in a first wavelength band supplied by a first WDM system and optical channels in a second wavelength band supplied by a second WDM system. The filter portion separates the optical channels into the two respective wavelength bands so that the optical channels in each of the wavelength bands can be supplied to a corresponding optical amplifier in each of the respective WDM systems. More specifically, the optical channels in the first wavelength band are routed to the optical amplifier in the first WDM system while the optical channels in the second wavelength band are routed to the optical amplifier in the second WDM system. After processing by the respective optical amplifiers, the optical channels in the two separate wavelength bands are re-combined in a combiner portion of the optical filter/combiner arrangement for simultaneous transmission as a composite signal in the same optical fiber.

In general, the optical filter/combiner arrangement according to the principles of the invention has practical utility for a variety of WDM network scenarios involving the combination of WDM systems operating in different wavelength bands in the same optical fiber. For example, the optical filter/combiner arrangement takes advantage of unused spectrum in an optical fiber for increasing capacity either through upgrades to existing WDM systems or with new DWDM system installations.

BRIEF DESCRIPTION OF THE DRAWING

A more complete understanding of the principles of the invention may be obtained from consideration of the following detailed description in conjunction with the drawing, with like elements referenced with like references, in which.

DETAILED DESCRIPTION OF THE INVENTION

An optical filter/combiner arrangement according to the principles of the invention provides a less costly and more flexible solution for upgrading the capacity of existing WDM networks. In particular, the optical filter/combiner arrangement is beneficial for upgrade scenarios that may be limited by the availability of installed optical fiber and in which it is desirable to retain the existing WDM system for cost or operational reasons.

Briefly, the optical filter/combiner arrangement according to the principles of the invention can be used to increase the capacity of a WDM network by processing a composite multi-wavelength signal comprising optical signals supplied by a first WDM system, e.g., an existing lower capacity WDM system, and optical signals supplied by a second WDM system, e.g., a new higher capacity WDM system.

The optical filter/combiner arrangement comprises a filter portion and a combiner portion. The filter portion separates the composite multi-wavelength signal into a first wavelength band comprising M optical channels supplied by the first WDM system and a second wavelength band comprising N optical channels supplied by the second WDM system. As is well-known, each WDM system may include its own service channels, hardware components, maintenance channel, add/drop channels, network management control, and the like. As such, the filter portion may also be used to separate, for example, the telemetry or supervisory channel associated with each of the systems. The optical channels in each of the separated wavelength bands are then supplied to their respective optical amplifiers in each of the WDM systems. More specifically, the optical channels in the first wavelength band are routed to the optical amplifier in the first WDM system while the optical channels in the second wavelength band are routed to the optical amplifier in the second WDM system. After processing by the respective optical amplifiers, the optical channels in the separated wavelength bands, together with their associated maintenance channel, are then re-combined in the combiner portion of the optical filter/combiner arrangement for transmission as a composite signal in the same optical fiber.

By using the optical filter/combiner arrangement according to the principles of the invention, a single optical fiber can simultaneously carry optical channels from an existing WDM system and at least one added WDM system without having to replace or discard the existing WDM system and without disrupting existing service. The cost of installing additional optical fiber is also avoided. As such, the invention provides a modular growth capability that increases capacity of existing WDM systems while preserving the investment and maintaining operational performance of the existing WDM system. The optical filter/combiner arrangement can be advantageously used in conjunction with both central office and transmission facilities.

Figure 1:
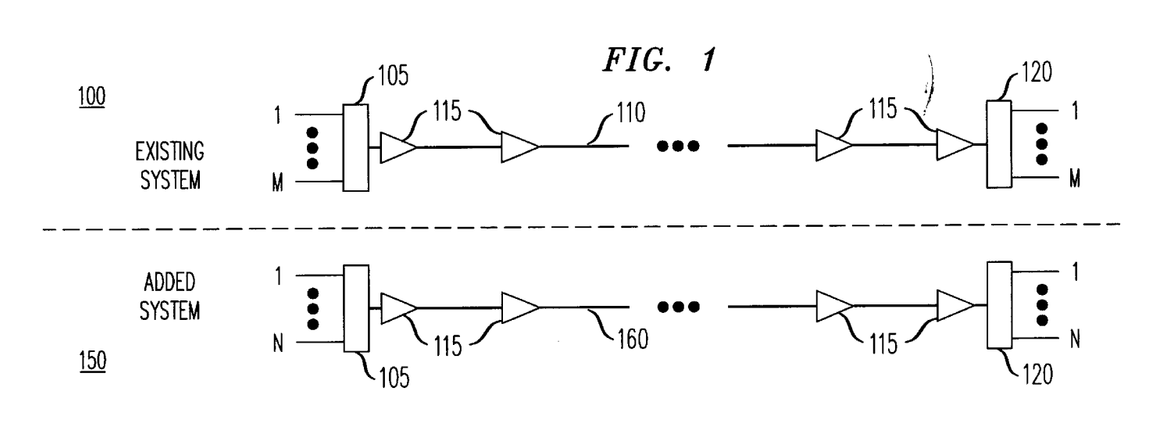
FIG. 1 shows a simplified block diagram illustrating a typical upgrade configuration for WDM systems.

FIG. 1 shows a simplified block diagram of a typical WDM system 100 having M wavelength channels in a given wavelength band. A typical low capacity WDM system would have M=8 or 16. As shown, an optical multiplexer 105 is used to combine M wavelength channels for transmission along optical fiber 110. Optical amplifiers 115 are disposed along optical fiber 110 to amplify the optical signals. At the receive end, the composite WDM signal is demultiplexed into M wavelength channels by optical demultiplexer 120 at the receive end of the WDM system.

FIG. 1 also illustrates one possible scenario for upgrading the capacity of a WDM network between two terminals. As shown, a second WDM system 150 includes N wavelength channels in a given wavelength band. The second system 150 may represent another low capacity system (e.g., 8 or 16 wavelengths) or may also be a higher capacity WDM system. In either case, each system operates independently over separate optical fibers 110 and 160 and the wavelength bands may or may not overlap. Although this scenario will increase the overall capacity by N channels so that a total of M+N channels is carried between terminals, this option requires a separate optical fiber 160 which may not be available or may be too costly to install.

Alternatively, a service provider may want to avoid the cost of installing additional optical fiber by routing M channels supplied by existing system 100 with N channels from added system 150 in the same optical fiber, assuming that each system occupies different wavelength bands. However, because of the aforementioned limitations of optical amplifiers in existing low capacity systems, this upgrade option would require the complete replacement of each of the existing optical amplifiers throughout the entire optical fiber path with new optical amplifiers. In particular, the new optical amplifiers would need to be broadband optical amplifiers that have the required usable gain bandwidth for amplifying the optical channels from the different wavelength bands. As with the first upgrade scenario, a service provider may not prefer this option given the lost investment in the original optical amplifier equipment as well as the operational downtime that would be incurred during the replacement period.

Figure 2:
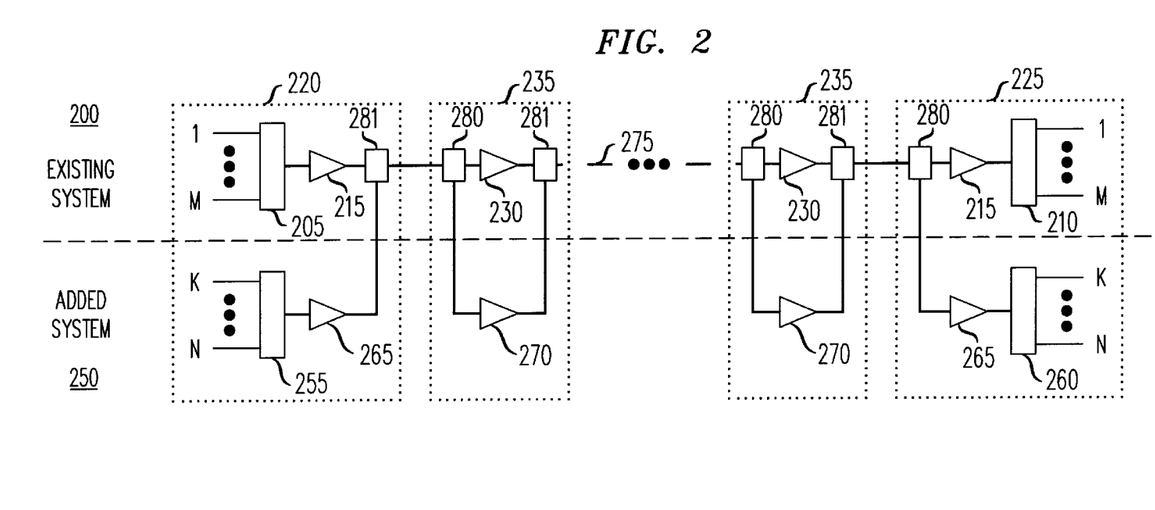
FIG. 2 shows a simplified block diagram illustrating a configuration for upgrading the capacity of an existing WDM system according to the principles of the invention.

FIG. 2 is a simplified system-level block diagram illustrating how the capacity of an existing WDM system can be increased according to the principles of the invention. As shown, an existing WDM system, represented here as 200, includes wavelength channels 1 through M in a first wavelength band. WDM system 200 includes typical WDM components, such as optical multiplexing/demultiplexing equipment 205 and 210, optical amplifiers 215 in the respective terminals 220 and 225, and optical amplifiers 230 at repeater sites 235. Similarly, a second WDM system 250 includes wavelength channels k through N in a second wavelength band that is different from the first wavelength band of WDM system 200. WDM system 250 includes typical WDM components, such as optical multiplexing/demultiplexing equipment 255 and 260, optical amplifiers 265 in the respective terminals 220 and 225 and optical amplifiers 270 at repeater sites 235. As shown, WDM systems 200 and 250 are coupled to the same optical fiber path 275.

According to the principles of the invention, WDM systems 200 and 250 can simultaneously operate over optical fiber 275 and WDM system components associated with WDM system 200, such as optical amplifiers 215 and 230, do not have to be discarded. According to the principles of the invention, an optical filter/combiner arrangement is used at terminals 220 and 225 and at repeater sites 235 for separating the l through M channels in the first wavelength band from the k through N channels in the second wavelength band prior to processing by respective WDM components in each of the separate systems and for combining the channels after processing by the respective components.

Using the repeater sites 235 as an example, filter portion 280 of the optical filter/combiner arrangement separates the l through M channels in the first wavelength band from the k through N channels in the second wavelength band prior to processing by the respective optical amplifier 230 and 270. As such, the channels of WDM system 200 are appropriately amplified by the existing optical amplifiers 230 while the channels from WDM system 250 are appropriately amplified by respective optical amplifiers 270. After being amplified by their respective optical amplifiers, the channels of WDM system 200 and the channels of WDM system 250 are then re-combined in combiner portion 281 of the optical filter/combiner arrangement and simultaneously transmitted in the same optical fiber 275 to succeeding repeaters and terminals.

At terminal 220, the channels from WDM system 200 and the channels from WDM system 250 are amplified by the respective terminal optical amplifiers 215 and 265 and combined in combiner portion 281 of an optical filter/combiner arrangement for transmission on optical fiber 275. At terminal end 225, the reciprocal action occurs in that the l through M channels of WDM system 200 are separated from the k through N channels of WDM system 250 in filter portion 280 of an optical filter/combiner arrangement and routed to the appropriate terminal equipment, e.g., optical demultiplexers 210 and 260. Although FIG. 2 only illustrates the combiner portion 281 of the optical filter/combiner arrangement at terminal 220 and filter portion 280 at terminal 225, it should be noted that the complete optical filter/combiner arrangement can be used at both terminal ends to support various network configurations. For example, filter portion 280 in terminal 225 and combiner portion 281 in terminal 220 may be used to support another direction of communication, e.g., bidirectional configuration of East to West and West to East, or the like. These embodiments will be described in more detail below.

The optical filter/combiner arrangement therefore provides a cost-effective solution for increasing the capacity of a WDM network by accommodating both the existing system and an added system over a single optical fiber. As shown, the system in FIG. 2 is increased to a total capacity of (l through M)+(k through N) channels without discarding existing WDM equipment of system 200 or requiring additional optical fiber as in prior arrangements. Moreover, existing service provided by WDM system 200 does not have to be disrupted when adding the channels from the new system 250.

Figure 3:
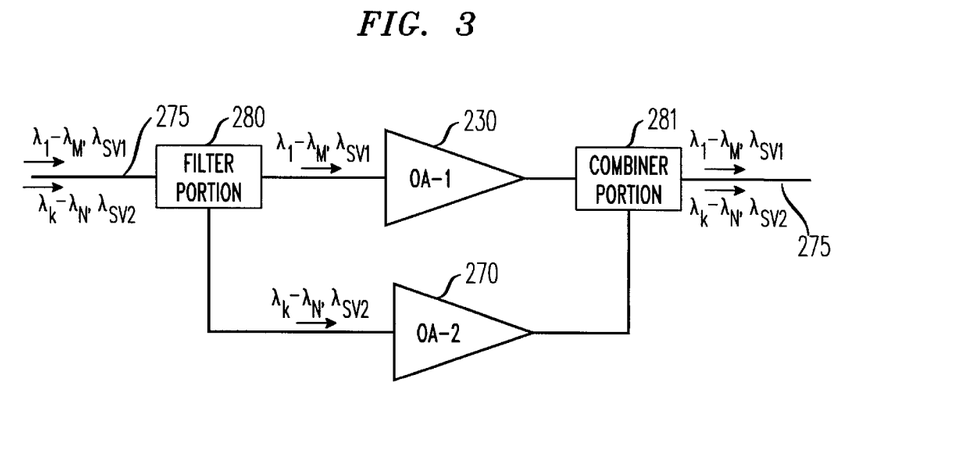
FIG. 3 shows a simplified schematic diagram of one exemplary embodiment of the optical filter/combiner arrangement in a WDM repeater configuration according to the principles of the invention.

FIG. 3 shows a simplified block diagram of the optical filter/combiner arrangement, which can be used, for example, at repeater site 235 in FIG. 2. Optical channels from WDM system 200 (FIG. 2) are represented as wavelength channels $\lambda_l$ to $\lambda_M$ with an associated supervisory channel $\lambda_{SV1}$. Similarly, optical channels from WDM system 250 (FIG. 2) are represented as wavelength channels $\lambda_k$ to $\lambda_N$ with an associated supervisory channel $\lambda_{SV2}$. The optical filter/combiner arrangement includes optical filter portion 280 for splitting a composite input signal into wavelength channels corresponding to respective wavelength bands. The optical filter/combiner arrangement further includes optical combiner portion 281 for re-combining the separated wavelength channels from the different wavelength bands into a composite output signal after processing by optical amplifiers 230 and 270, where OA-1 represents the optical amplifier for the existing WDM system and OA-2 represents the optical amplifier for the added WDM system.

At optical filter portion 280, wavelength channels $\lambda_l$ to $\lambda_M$ and associated supervisory channel $\lambda_{SV1}$ are separated from wavelength channels $\lambda_k$ to $\lambda_N$ and associated supervisory channel $\lambda_{SV2}$. Wavelength channels $\lambda_l$ to $\lambda_M$ and associated supervisory channel $\lambda_{SV1}$ are supplied to optical amplifier 230. Similarly, wavelength channels $\lambda_k$ to $\lambda_N$ and associated supervisory channel $\lambda_{SV2}$ are supplied to optical amplifier 270. At optical combiner portion 281, wavelength channels $\lambda_l$ to $\lambda_M$ and associated supervisory channel $\lambda_{SV1}$ and wavelength channels k to $\lambda_N$ and associated supervisory channel $\lambda_{SV2}$ are re-combined for simultaneous transmission along optical fiber 275.

Figure 4:
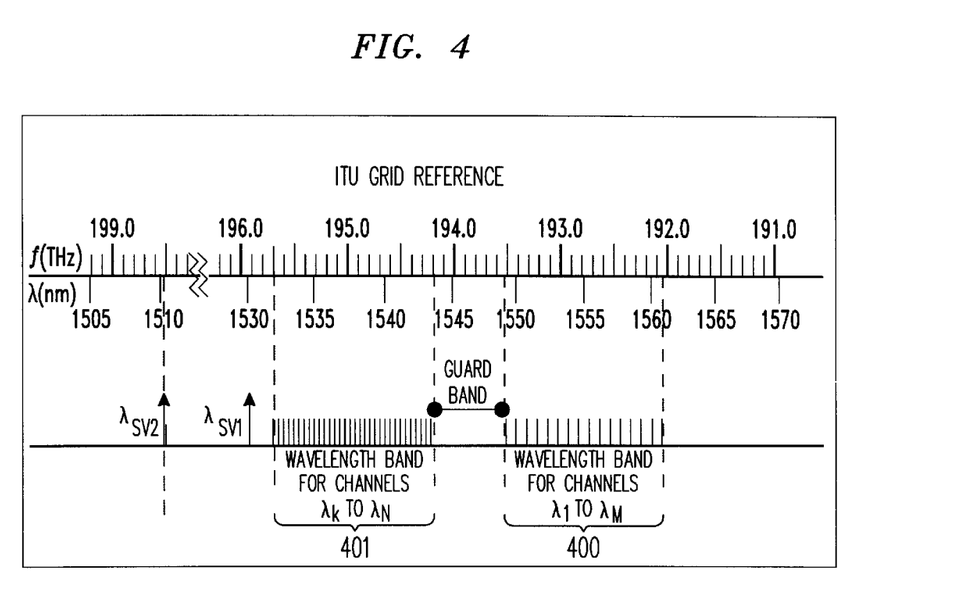
FIG. 4 shows an exemplary wavelength allocation for WDM systems used with the present invention.

FIG. 4 shows one example of a possible wavelength allocation for two WDM systems operating over the same optical fiber using the optical filter/combiner arrangement according to the principles of the invention. More specifically, wavelength band 400 includes wavelengths $\lambda_l$ to $\lambda_M$ associated with the optical channels of an existing WDM system, e.g., a low capacity system. Wavelength band 401 includes wavelengths $\lambda_k$ to $\lambda_N$ associated with the optical channels of a second WDM system, e.g., a higher capacity system. A guard band 405 is required between wavelength bands 400 and 401 to facilitate the filtering functions of the optical filter/combiner arrangement as will be described in more detail below. In particular, the width of guard band 405 will depend on the filter technology selected for the optical filter/combiner arrangement. For example, guard band 405 may only be several nanometers if thin-film filter technology is employed as will be described in more detail below. It should also be noted that the channel spacing in the different wavelength bands may or may not be the same.

FIG. 4 also illustrates one example of wavelength allocation for supervisory or telemetry channels used in WDM systems. As is well-known, a separate optical channel is used as a communication channel for maintenance or other network management purposes. This communication channel is mostly referred to as a telemetry or supervisory channel. In some WDM systems, the telemetry or supervisory channel may occupy a separate wavelength region outside of the wavelength band of the other optical channels. FIG. 4 illustrates one such example in which supervisory channel $\lambda_{SV1}$ is outside of wavelength band 400 for the low capacity WDM system. Similarly, some newer WDM systems are known to use a supervisory channel having a wavelength assignment that is also outside of the wavelength band of the other optical channels. In the example shown in FIG. 4, supervisory channel $\lambda_{SV2}$ corresponds to the higher capacity WDM system operating in wavelength band 401. FIG. 4 also illustrates the case where a wavelength band may intervene between another wavelength band and its corresponding supervisory channel, e.g., wavelength band 401 between wavelength band 400 and its associated supervisory channel $\lambda_{SV1}$.

Filtering requirements for the optical filter/combiner arrangement will vary depending on the wavelength allocation for the wavelength bands and the associated telemetry and supervisory channels. Consequently, the wavelength allocation shown in FIG. 4 is not meant to be limiting, but instead only illustrative of one example in which separate filtering may be required for the channels in a wavelength band and the corresponding supervisory channel. Other embodiments are contemplated by the invention, such as the simpler case in which the telemetry or supervisory channel do not require separate filtering, but instead can be filtered along with the other remaining channels in the wavelength band. For simplicity of explanation, reference will be made hereinafter to the example where one of the wavelength bands intervenes between the other wavelength band and its associated the supervisory channel as shown in FIG. 4.

Figure 5:
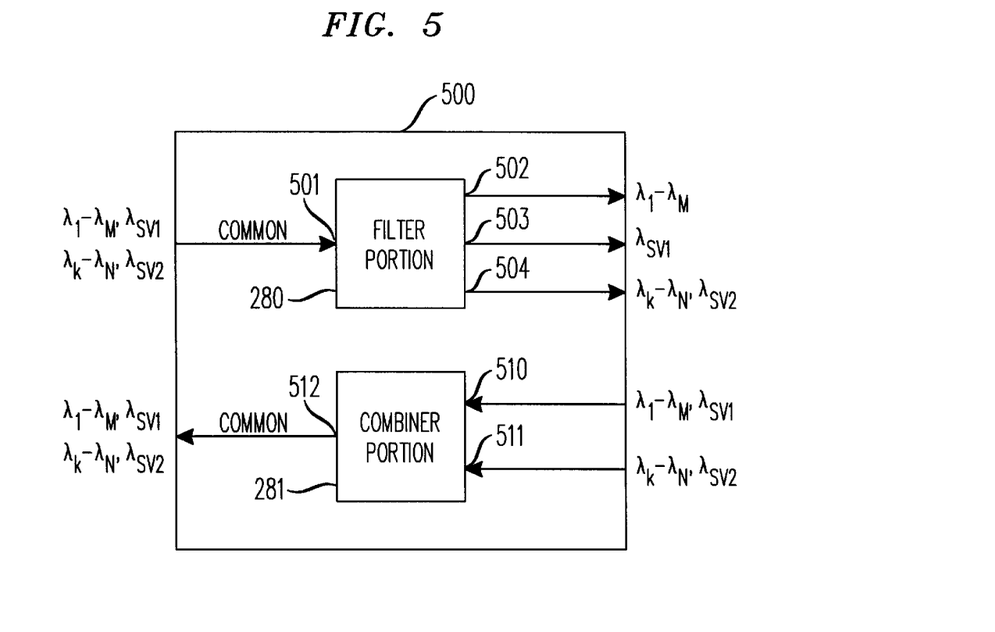
FIG. 5 shows a simplified functional block diagram of an exemplary embodiment of the optical filter/combiner arrangement according to the principles of the invention.

FIG. 5 shows a simplified functional block diagram of one embodiment of the optical filter/combiner arrangement 500. For integration and space considerations, optical filter/combiner arrangement 500 is ideally packaged into a single circuit pack configuration having a requisite number of input and output ports for connection to central office or terminal equipment such as optical amplifiers and the like. As shown, filter portion 280 includes one common input port 501 which includes wavelength channels $\lambda_I$ to $\lambda_M$ and associated supervisory channel $\lambda_{SV1}$ and wavelength channels $\lambda_k$ to $\lambda_N$ with associated supervisory channel $\lambda_{SV2}$. Filter portion 280 further includes three output ports 502, 503, and 504. Port 502 supplies wavelength channels $\lambda_I$ to $\lambda_M$, while port 503 separately supplies supervisory channel $\lambda_{SV1}$. Port 504 supplies wavelength channels $\lambda_k$ to $\lambda_N$ with associated supervisory channel $\lambda_{SV2}$. Combiner portion 281 includes two input ports 510 and 511 and a common output port 512. As shown, port 510 includes wavelength channels $\lambda_I$ to $\lambda_M$ with associated supervisory channel $\lambda_{SV1}$ and port 511 includes wavelength channels $\lambda_k$ to $\lambda_N$ and associated supervisory channel $\lambda_{SV2}$. Common output port 512 supplies the composite signal as shown.

Figure 6:
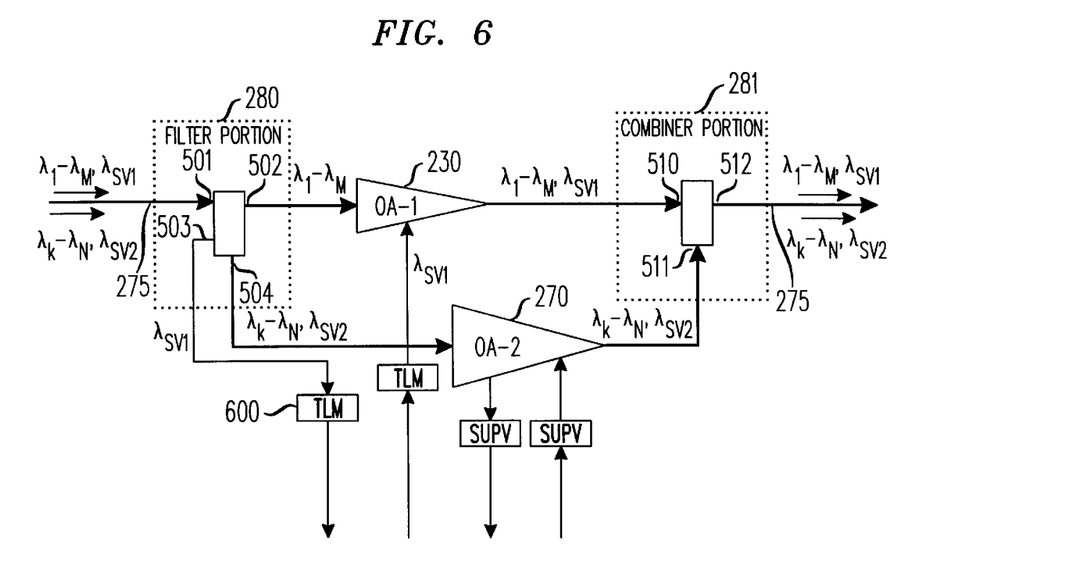
FIG. 6 is a simplified schematic diagram of an exemplary embodiment of the optical filter/combiner arrangement in a WDM repeater configuration according to the principles of the invention.

FIG. 6 is a simplified schematic diagram of one embodiment of the optical filter/combiner arrangement for use at an optical amplifier repeater site. This embodiment is similar to that shown and described in FIG. 3, except for the features relating to the filtering of the supervisory channels. Optical channels from an existing WDM system are represented as wavelength channels $\lambda_I$ to $\lambda_M$ with associated supervisory channel $\lambda_{SV1}$. Similarly, optical channels from a WDM system to be added are represented as wavelength channels $\lambda_k$ to $\lambda_N$ with associated supervisory channel $\lambda_{SV2}$. To facilitate a better understanding of the input and output flows from filter portion 280 and combiner portion 281, reference numerals for the port functions previously defined in FIG. 5 are also included here in FIG. 6.

As shown, a composite signal including wavelength channels $\lambda_I$ to $\lambda_M$, $\lambda_{SV1}$, $\lambda_k$ to $\lambda_N$, and $\lambda_{SV2}$ is provided as input to port 501 of filter portion 280 of the optical filter/combiner arrangement. Using well-known thin-film filter technology, which will be described below in more detail, wavelength channels $\lambda_I$ to $\lambda_M$ are appropriately filtered and transmitted via port 502 to optical amplifier (OA-1) 230 corresponding to the existing WDM system. Because wavelength channel $\lambda_{SV1}$ is outside the wavelength band corresponding to wavelength channels $\lambda_I$ to $\lambda_M$, wavelength channel $\lambda_{SV1}$ is separately filtered and transmitted via port 503 for processing by appropriate components in a WDM system, e.g., telemetry circuit pack 600. The remaining wavelength channels $\lambda_k$ to $\lambda_N$ and $\lambda_{SV2}$ are appropriately filtered and transmitted via port 504 to optical amplifier (OA-2) 270 which corresponds to the other WDM system. Using well-known techniques, optical amplifiers 230 and 270 provide the appropriate filtering for the supervisory channels. Wavelength channels $\lambda_I$ to $\lambda_M$ and $\lambda_{SV1}$ supplied from optical amplifier 230 and wavelength channels $\lambda_k$ to $\lambda_N$ and $\lambda_{SV2}$ supplied from optical amplifier 270 are then supplied as separate inputs via ports 510 and 511, respectively, to combiner portion 281 of the optical filter/combiner arrangement. Combiner portion 281 re-combines the wavelength channels from each of the separate wavelength bands and supplies a composite signal as output from port 512.

It should be noted that other techniques for filtering supervisory channel $\lambda_{SV1}$ may be used consistent with the teachings herein. For example, wavelength channel $\lambda_{SV1}$ may be filtered with wavelength channels $\lambda_I$ to $\lambda_M$ in filter portion 280. An additional filter element (not shown) could then be incorporated to separately filter wavelength channel $\lambda_{SV1}$ from wavelength channels $\lambda_I$ to $\lambda_M$ just prior to optical amplifier (OA-1) 230. The additional filter element would then supply the filtered wavelength channel $\lambda_{SV1}$ to the telemetry circuit pack as described above. In another example, wavelength channel $\lambda_{SV1}$ could be filtered using a filter that is incorporated in optical amplifier (OA-1) 230.

Figure 7:
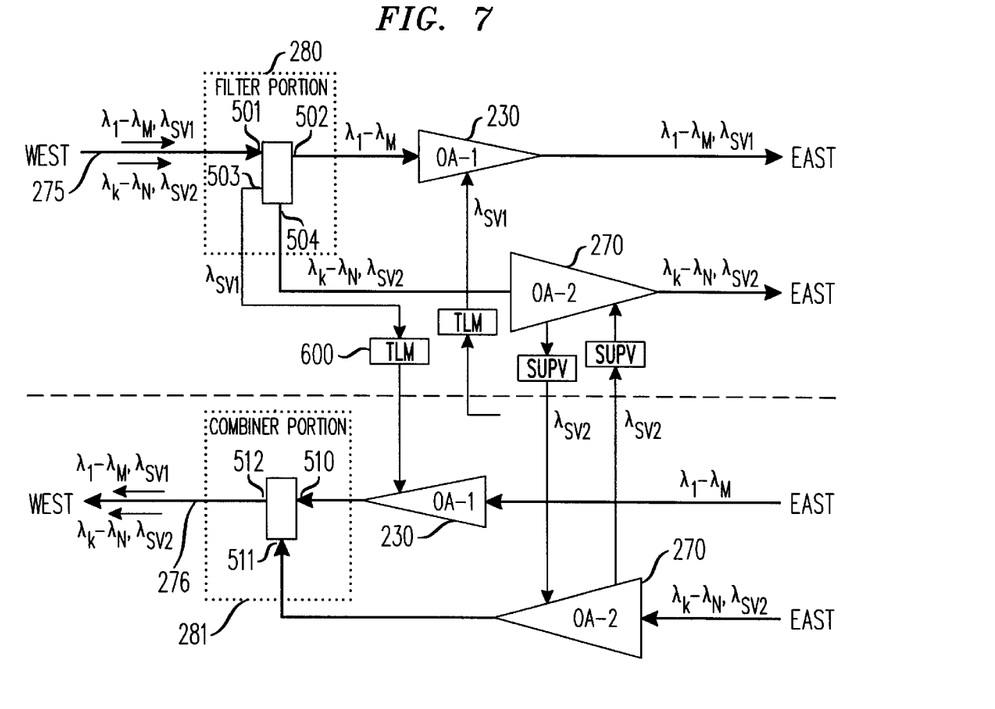
FIG. 7 is a simplified schematic diagram of another exemplary embodiment of the optical filter/combiner arrangement in a WDM repeater configuration according to the principles of the invention.

FIG. 7 shows an alternative embodiment of the optical filter/combiner arrangement for use at an optical amplifier repeater site. As compared with the embodiment shown in FIG. 6, FIG. 7 represents an example of how the optical filter/combiner arrangement can be used to support two separate optical fiber paths 275 and 276 such as in an East to West and West to East optical ring configuration. For example, filter portion 280 can be associated with one direction of communication along optical fiber 275, while combiner portion 281 can be associated with another direction of communication along optical fiber 276. However, filter portion 280 and combiner portion 281 can still be integrated in a single circuit pack as shown in FIG. 5. The basic principles of operation are the same as those previously described for the embodiment in FIG. 6. In addition to those features and principles of operation previously described, FIG. 7 shows typical connectivity between the various components in the two optical fiber paths 275 and 276 for the supervisory channels. This type of connectivity is well-known to those skilled in the art.

Alternatively, FIG. 7 also represents an exemplary embodiment for use of the optical filter/combiner arrangement at a terminal of a WDM system, such as terminal 225 shown in FIG. 2. Again, this configuration would be particularly well-suited for two directions of communication, e.g., East to West and West to East on separate optical fibers. Other modifications to the configuration of the optical filter/combiner arrangement in terminal and repeater applications will be apparent to those skilled in the art.

Figure 8:
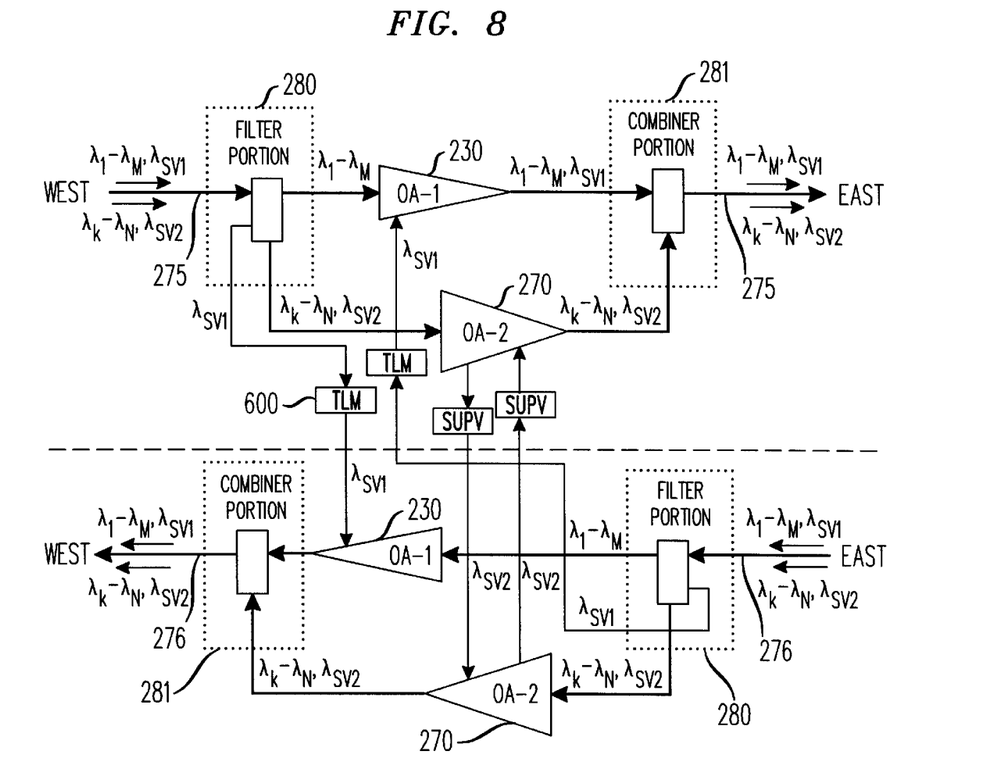
FIG. 8 is a simplified schematic diagram of another exemplary embodiment of the optical filter/combiner arrangement in a WDM repeater configuration according to the principles of the invention.

FIG. 8 is a simplified schematic diagram showing the use of two optical filter/combiner arrangements using a combination of the configurations shown and described in FIGS. 6 and 7. In particular, FIG. 8 shows two directions of communications, i.e., East to West and West to East, with optical filter/combiner arrangements provided in each optical fiber 275 and 276 and coupled to optical amplifiers (OA-1) 230 for a first WDM system and optical amplifiers (OA-2) 270 for a second WDM system. The same principles of operation previously described for the embodiments shown in FIGS. 6 and 7 apply equally to the embodiment shown in FIG. 8 and will not be repeated for sake of brevity.

It should be noted that one optical filter/combiner arrangement comprising a filter portion 280 and a combiner portion 281 in a single integrated circuit pack may be coupled to the optical amplifiers in the West to East direction of communication (e.g., along one fiber) while another separate optical filter/combiner arrangement in another integrated circuit pack may be coupled to the optical amplifiers in the East to West direction of communication (e.g., along the other fiber). In FIG. 8, this configuration would be represented by a single optical filter/combiner arrangement located in the fiber path above the dotted line, i.e., filter portion 280 at the West interface and combiner portion 281 at the East interface. The other optical filter/combiner arrangement would be located in the other fiber path below the dotted line, i.e., combiner portion 281 at the West interface and filter portion 280 at the East interface.

Alternatively, one optical filter/combiner arrangement in an integrated circuit pack may be used on the West interface for coupling to both of the fiber paths, i.e., filter portion 280 on the top West interface above the dotted line and combiner portion 281 on the bottom West interface below the dotted line. The other separate optical filter/combiner arrangement in another integrated circuit pack would be used on the East interface for coupling to both of the fiber paths, i.e., combiner portion 281 on the top East interface above the dotted line and filter portion 280 on the bottom East interface below the dotted line. Other modifications to the optical filter/combiner arrangement for use in other configurations will be apparent to those skilled in the art and are contemplated by the teachings herein.

Figure 9:
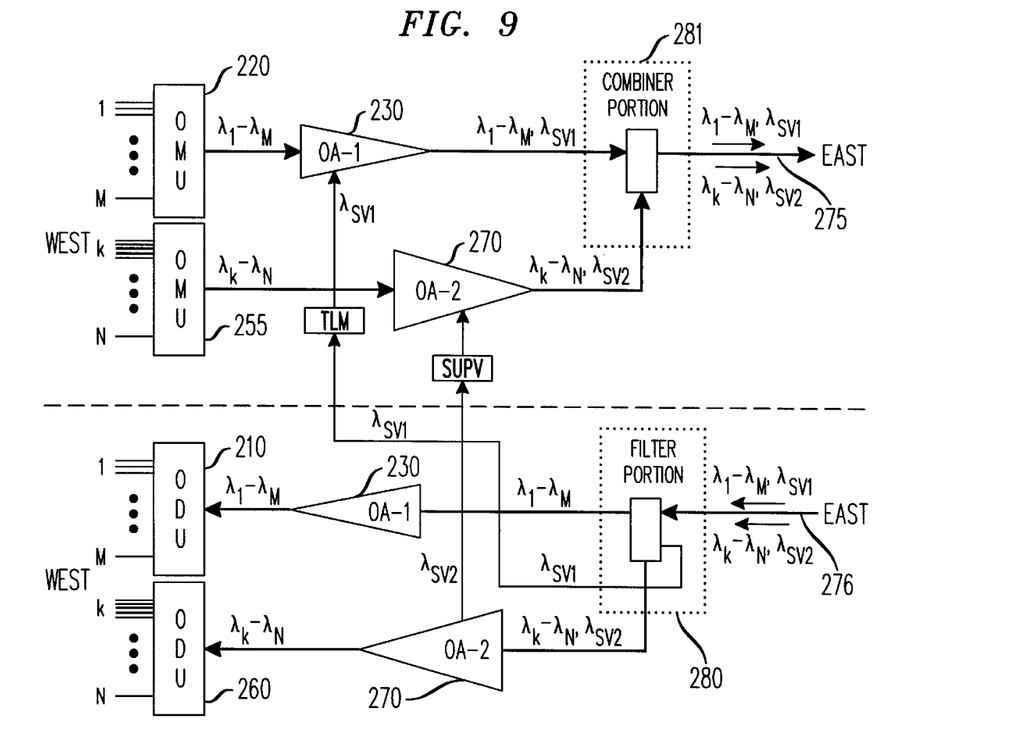
FIG. 9 shows an exemplary embodiment of the optical filter/combiner arrangement in a WDM terminal configuration according to the principles of the invention.

FIG. 9 shows an illustrative embodiment of the optical filter/combiner arrangement used in a WDM terminal application. The principles of operation are similar to those previously described for the optical filter/combiner arrangement used in a WDM repeater application. As shown, filter portion 280 accommodates one direction of communication over an optical fiber, e.g., East to West, while combiner portion 281 accommodates another direction of communication via a different optical fiber, e.g., West to East. More specifically, optical combiner portion 281 receives optical channels in two separate wavelength bands supplied by optical multiplexer unit 220 and optical multiplexer unit 255. Additionally, supervisory optical channels are supplied by the respective sources communicating with optical amplifiers 230 and 270. Combiner portion 281 combines the wavelength channels for transmission over a single optical fiber.

Similarly, filter portion 280 at the WDM terminal receives a composite signal and splits the composite signal into the separate wavelength bands for appropriate processing by optical components corresponding to each of the WDM systems. In particular, wavelength channels in one wavelength band are supplied to optical amplifier 230 and optical demultiplexer unit 210 corresponding to one WDM system while wavelength channels in the other wavelength band are supplied to optical amplifier 270 and optical demultiplexer unit 260 corresponding to the other WDM system. The supervisory optical channels are filtered and routed to the appropriate telemetry and supervisory circuit packs in the WDM system. The principles of operation of filter portion 280 and combiner portion 281 are similar to those described for the WDM repeater configuration. As such, details of the filtering and combining of the specific wavelength channels will not be repeated here for sake of brevity.

Figure 10A:
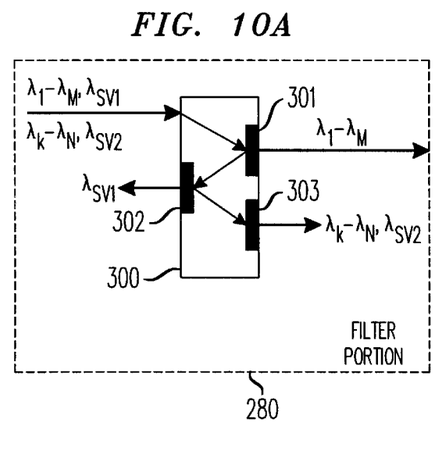
FIGS. 10A, 10B, and 11 show exemplary embodiments of the filter and combiner portions of the optical filter/combiner arrangement using thin-film filter technology according to the principles of the invention.
Figure 10B:
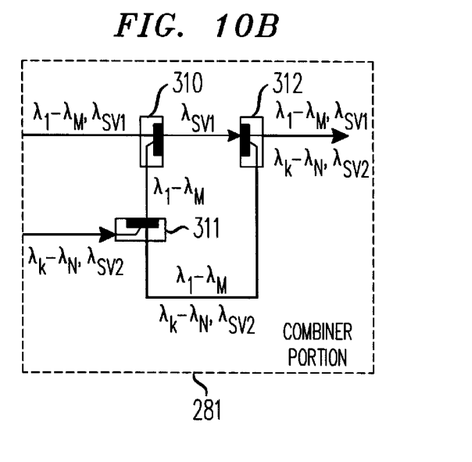
Figure 11:
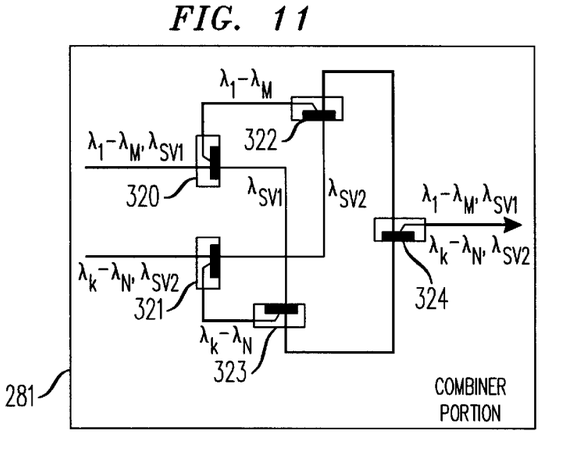

FIGS. 10 and 11 show embodiments of optical filter/combiner arrangement in which filter portion 280 and combiner portion 281 are implemented with thin-film filter technology. Details about the operation and fabrication of such thin-film filters are well known to persons skilled in the art, see, e.g., U.S. Pat. No. 5,583,683 issued to Scobey, which is incorporated by reference herein. Briefly, thin-film filters exploit the interference characteristics of optical waves in order to cause some frequencies in an optical signal to be reflected by the filter elements, and to cause others to be transmitted through the filter elements. Each filter element typically comprises a resonant cavity composed of multiple dielectric thin-film layers. Each layer is of a specified thickness and layers of differing thicknesses are stacked in a predetermined order so that a broad range of frequencies may be reflected by each filter element.

Referring to FIG. 10A, filter portion 280 comprises a thin-film interference filter 300 having individual filter elements 301–303 which are designed to be effective at respective pre-selected wavelength channels. Generally, filter elements 301–303 operate by causing pre-selected wavelength channels to be transmitted through the filter elements 301–303, and by causing other wavelength channels to be reflected by the filter elements 301–303. As shown, filter 300 is configured with the appropriate number of input and output ports corresponding to filter elements 301–303 to transmit the appropriate wavelength channels.

In operation, a composite signal comprising wavelength channels $\lambda_1$, to $\lambda_M$, $\lambda_{SV1}$, $\lambda_k$ to $\lambda_N$, and $\lambda_{SV2}$ is provided as input to filter 300. As shown, wavelength channels $\lambda_1$, to $\lambda_M$ are transmitted at filter element 301 while the remaining wavelength channels are reflected. Similarly, $\lambda_{SV1}$ is transmitted at filter element 302 while the remaining wavelength channels $\lambda_k$ to $\lambda_N$ and $\lambda_{SV2}$ are reflected and then transmitted at filter element 303.

Referring to FIG. 10B, combiner portion 281 comprises filter elements 310–312 which operate in a similar manner as previously described for filter portion 280. More specifically, filter element 310 is transmissive with respect to $\lambda_{SV1}$ and reflective with respect to $\lambda_1$ to $\lambda_M$. Filter element 311 is transmissive with respect to $\lambda_{1\ to\ \lambda M}$ and reflective with respect to $\lambda_k$ to $\lambda_N$ and $\lambda_{SV2}$. Filter element 312 is transmissive with respect to $\lambda_{SV1}$ and reflective with respect to $\lambda_1$ to $\lambda_M$, $\lambda_k$ to $\lambda_N$, and $\lambda_{SV2}$.

The design of filter portion 280 and combiner portion 281 in the foregoing embodiments is only meant to be illustrative and not limiting. In particular, the number of filter elements can be varied depending on desired performance characteristics. For example, additional filter elements may be used to provide double reflections of the optical signals which may be desirable to increase the isolation between wavelength bands. For example, FIG. 11 shows an alternative embodiment for combiner portion 281 in which additional filter elements are used to increase the isolation between the wavelength channels being transmitted and reflected. Although the configuration of filter elements 320–324 in FIG. 11 is different from the previous embodiment, the principles operation are the same in that filter elements 320–324 are designed to be transmissive and reflective of pre-selected wavelengths in the wavelength bands. The detailed operation of filter elements 320–324 in FIG. 11 will not be repeated here for sake of brevity.

Figure 12:
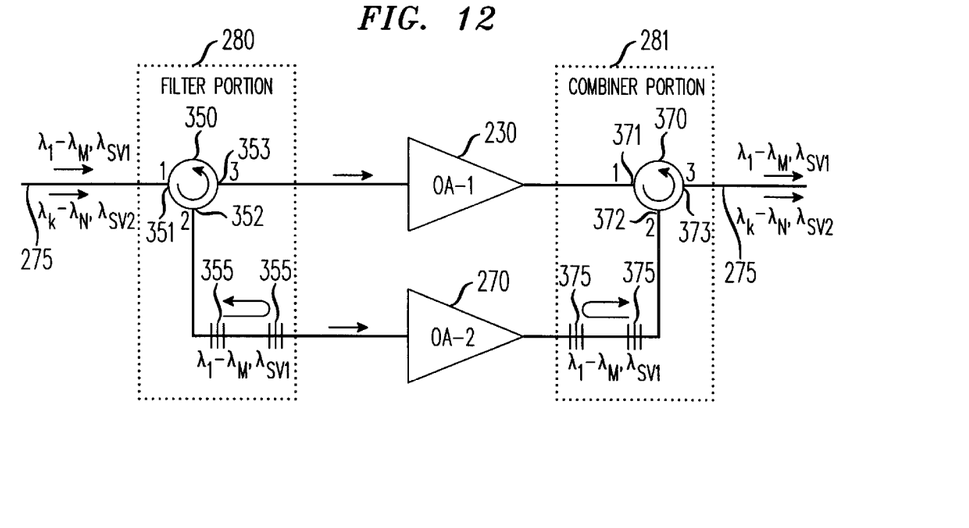
FIGS. 12 and 13 show other exemplary embodiments of the optical filter/combiner arrangement using fiber Bragg grating and circulator technology according to the principles of the invention.
Figure 13:
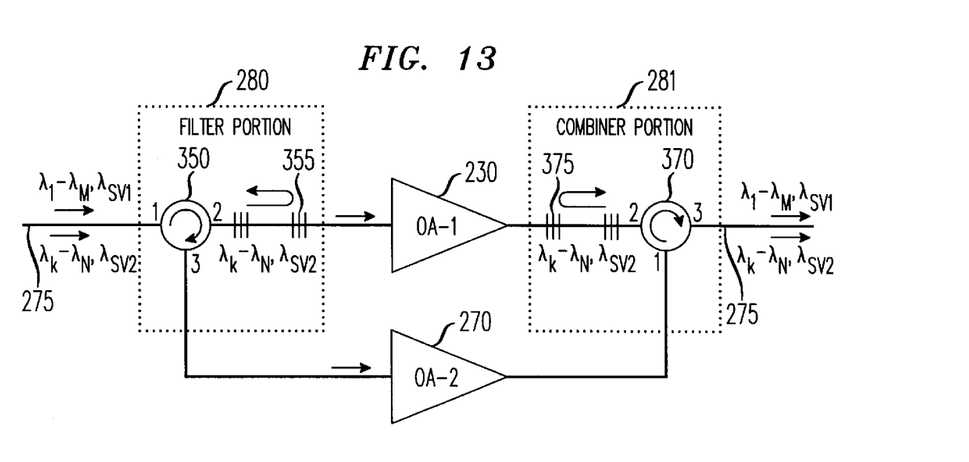

FIGS. 12 and 13 show alternative embodiments in which filter portion 280 and combiner portion 281 are implemented with fiber Bragg gratings and optical circulators instead of thin-film interference filters. Details of the operation of optical circulators and fiber gratings are well-known to persons skilled in the art. It should be noted that selection of the appropriate filter technology will depend on several factors. For example, fiber gratings and circulators may add more cost and insertion loss as compared with thin film filter technology. Additionally, as is well known, the use of fiber Bragg gratings as filters may be limited to only a small subset of the optical channels located at shorter wavelengths as a result of transmission losses from cladding mode reflections. In either case, it will be apparent to those skilled in the art that the principles of the invention are applicable to a variety of different optical filter technologies. In general, there are many considerations that may be relevant in deciding on the appropriate implementation for the optical filter/combiner arrangement. These considerations may include loss characteristics, dispersion characteristics, size of the guard band between wavelength bands, isolation requirements for different wavelength bands, and so on.

Referring to FIG. 12, filter portion 280 comprises optical circulator 350 and fiber gratings 355 coupled as shown to optical amplifiers 230 and 270. As shown, a composite signal is received as input at port 351 and is provided as output at port 352. In this example, fiber gratings 355 are transmissive with respect to wavelength channels $\lambda_k$ to $\lambda_N$ and $\lambda_{SV2}$ and reflective with respect to wavelength channels $\lambda_l$ to $\lambda_M$ and $\lambda_{SV1}$. As such, wavelength channels $\lambda_k$ to $\lambda_N$ and $\lambda_{SV2}$ are routed through their respective optical amplifier 270 while wavelength channels $\lambda_l$ to $\lambda_M$ and $\lambda_{SV1}$ are reflected back into port 352. Wavelength channels $\lambda_l$ to $\lambda_M$ and $\lambda_{SV1}$ are routed via port 353 to their respective optical amplifier 230.

At combiner portion 281, wavelength channels $\lambda_l$ to $\lambda_M$ and $\lambda_{SV1}$ are received at port 371 of optical circulator 370 and transmitted to port 372. Fiber gratings 375, which may be the same as gratings 355, are transmissive with respect to wavelength channels $\lambda_k$ to $\lambda_N$ and $\lambda_{SV2}$ and reflective with respect to wavelength channels $\lambda_l$ to $\lambda_M$ and $\lambda_{SV1}$. As such, wavelength channels $\lambda_l$ to $\lambda_M$ and $\lambda_{SV1}$ are reflected back to port 372 and are transmitted to port 373. Furthermore, wavelength channels $\lambda_k$ to $\lambda_N$ and $\lambda_{SV2}$ are transmitted from optical amplifier 270 and through fiber gratings 375 to port 372 of circulator 370. All wavelength channels $\lambda_l$ to $\lambda_M$, $\lambda_{SV1}$, $\lambda_k$ to $\lambda_N$, and $\lambda_{SV2}$ are transmitted out port 373 as a composite signal.

FIG. 13 shows another embodiment that differs from the previous embodiment only in the direction of circulation through circulators 350 and 370 and also in the transmissive and reflective properties of fiber gratings 355 and 375. In particular, fiber gratings 355 and 375 are transmissive with respect to wavelength channels $\lambda_l$ to $\lambda_M$ and $\lambda_{SV1}$ and reflective with respect to wavelength channels $\lambda_k$ to $\lambda_N$ and $\lambda_{SV2}$.

Figure 14:
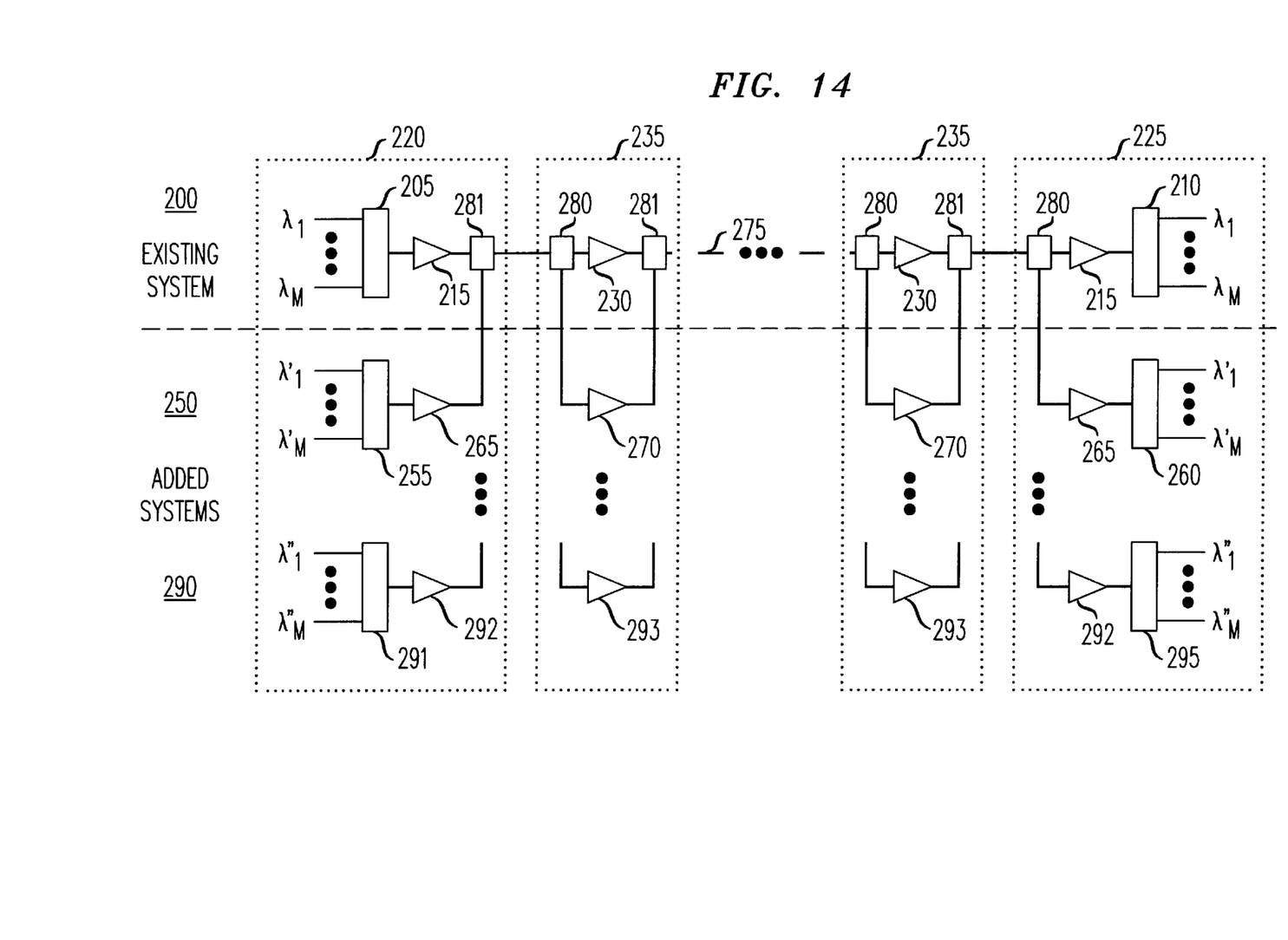
FIG. 14 shows a simplified block diagram illustrating the system connectivity for a multiple system upgrade configuration according to the principles of the invention.
Figure 15:
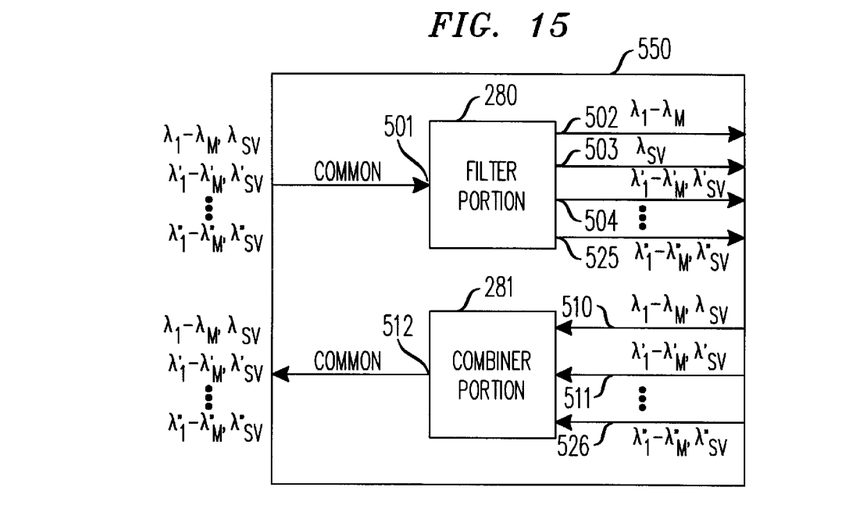
FIG. 15 is a simplified functional block diagram of another exemplary embodiment of the optical filter/combiner arrangement for supporting the multiple system upgrade shown in FIG. 14.

FIGS. 14 and 15 illustrate how the optical filter/combiner arrangement can be used according to the principles of the invention to support the addition of more than two WDM systems in a more complex upgrade scenario. More specifically, FIG. 14 illustrates how additional systems, e.g., WDM system 290, can be added to the same optical fiber that already carries two or more systems, e.g., systems 200 and 250.

FIG. 14 is very similar to FIG. 2 in that most of the elements are the same with some notable exceptions. In particular, system 290, like systems 200 and 250, also includes typical WDM components, such as optical multiplexing/demultiplexing equipment 291 and 295, optical amplifiers 292 in the respective terminals 220 and 225, and optical amplifiers 293 at repeater sites 235. As shown, system 200 includes optical channels having wavelengths in one wavelength band, represented as $\lambda_l$ to $\lambda_M$, system 250 includes optical channels having wavelengths in another wavelength band, represented as $\lambda_l'$ to $\lambda_M'$, and system 290 includes optical channels having wavelengths in yet another wavelength band, represented as $\lambda_l''$ to $\lambda_M''$. As will be described in more detail below, optical filter/combiner arrangements can be designed to accommodate more than two WDM systems over the same optical fiber, wherein each WDM system is operating in different wavelength bands. Accordingly, the optical filter/combiner arrangement is not unnecessarily limited by the number of systems that may be added to upgrade the capacity along a single optical fiber.

This aspect of the invention is also important in terms of demonstrating that the optical filter/combiner arrangement has utility beyond just an upgrade scenario involving only existing WDM systems. In particular, the optical filter/combiner arrangement may be needed for a new installation of a high capacity system. As an example, a service provider may require 160 channels along a single optical fiber. In one illustrative embodiment, the optical filter/combiner arrangement can be used to add 80 channels from one wavelength band (e.g., a C-band system with its associated optical amplifiers) and 80 channels from another wavelength band (e.g., a L-band system with its associated optical amplifiers). Again, this example is only meant to be illustrative and not limiting. In sum, the optical filter/combiner arrangement according to the principles of the invention has practical utility for a variety of WDM network scenarios involving the combination of WDM systems operating in different wavelength bands along the same optical fiber.

FIG. 15 is a simplified functional block diagram of an exemplary embodiment of the optical filter/combiner arrangement 550 for supporting a multiple system upgrade, such as that shown in FIG. 14. The configuration shown in FIG. 15 is very similar to that previously shown and described in FIG. 5 with some notable exceptions. In particular, FIG. 15 illustrates the input and output port assignments for supporting more than two systems operating in different wavelength bands. As shown, the wavelength bands and associated supervisory channels are represented as $\lambda_l$ to $\lambda_M$, and $\lambda_{SV}$ for a first system, $\lambda_l'$ to $\lambda_M'$, and $\lambda_{SV}'$ for another system, $\lambda_{l''\ to\ \lambda M''}$, and $\lambda_{SV}''$, for another system, and so on. The principles of operation previously described in FIG. 5 apply equally here and will not be repeated for sake of brevity. The significant difference in FIG. 15 is that additional output ports are included on the filter portion 280, e.g., output port 525, and additional input ports are included on the combiner portion 281, e.g., input port 526, to accommodate optical channels from other wavelength bands, e.g., shown here as channels in the wavelength band $\lambda_l''$ to $\lambda_M''$, and $\lambda_{SV}''$.

It will be understood that particular embodiments described above are only illustrative of the principles of the present invention, and that various modifications could be made by those skilled in the art without departing from the spirit and scope of the present invention. For example, the optical filter arrangement according to the principles of the invention may be implemented using different filter technologies. Moreover, in addition to supporting WDM network expansion using current and next generation WDM systems, the optical filter/combiner arrangement can also be used for modular optical amplifier-based expansion, bi-directional optical amplifier-based systems, and add/drop applications. Accordingly, the scope of the present invention is limited only by the claims that follow.

What is claimed is:

1. In a wavelength division multiplexed (WDM) network comprising a first WDM system in an existing configuration including a first transmit terminal node, at least a first optical amplifier, and a first receive terminal node coupled via a first optical fiber, wherein the first WDM system transports a first WDM signal comprising a plurality of optical channels of different wavelengths in a first wavelength band, the WDM network adapted to couple at least a second WDM system to the first optical fiber to transport a second WDM signal comprising a second plurality of optical channels of different wavelengths in a second wavelength band, the second WDM system including a second transmit terminal node, at least a second optical amplifier, and a second receive terminal node so that the second WDM signal is transported along with the first WDM signal in the first optical fiber, a system for upgrading the capacity of the WDM network comprising:

a combiner for coupling the second WDM signal generated by the second transmit terminal node with the first WDM signal generated by the first transmit terminal node while maintaining service in the first WDM system;

a filter/combiner arrangement for;

receiving the first and second WDM signals in the first optical fiber, splitting the first and second WDM signals as a finction of the first and second wavelength bands so that the first WDM signal is amplified by the first optical amplifier according to the existing configuration and so that the second WDM signal is routed to and separately amplified by the second optical amplifier, and recombining the first and second amplified WDM signals for transmission along the first optical fiber; and a filter for separating and directing the first and second WDM signals to the first and second receive terminal nodes, respectively, wherein the first and second WDM systems are separate systems operating simultaneously over the first optical fiber and wherein the capacity of the WDM network is upgraded to carry both the first and second WDM signals while maintaining service in the first WDM system using components in the existing configuration.

2. The system according to claim 1, wherein the first and second wavelength bands have a guard band therebetween.

3. The system according to claim 1, wherein the filter/combiner arrangement is operable to separately filter a supervisory optical channel associated with the first WDM system and a supervisory optical channel associated with the second WDM system so that existing supervisory functions of the first WDM system are separately maintained according to the existing configuration.

4. The system according to claim 1, wherein the filter/combiner arrangement is coupled to the first and second optical amplifiers in a bi-directional configuration, wherein a filter portion of the arrangement is associated with one direction of communication along the first optical fiber and wherein a combiner portion of the arrangement is associated with another direction of communication along a second optical fiber.

5. The system according to claim 4, wherein the filter portion comprises:

an optical circulator having a first port for receiving the first and second WDM signals, a second port, and a third port coupled to one of the first or second optical amplifiers; and at least one fiber grating coupled between the second port of the optical circulator and to another of the first or second optical amplifiers, the at least one fiber grating being transmissive with respect to selected wavelengths and reflective with respect to other selected wavelengths.

6. The system according to claim 4, wherein the combiner portion comprises:

an optical circulator having a first port coupled to one of the first or second optical amplifiers, a second port, and a third port for supplying an output signal; and at least one fiber grating coupled between the second port of the optical circulator and to another of the first or second optical amplifiers, the at least one fiber grating being transmissive with respect to selected wavelengths and reflective with respect to other selected wavelengths.

7. The system according to claim 1, wherein the filter/combiner arrangement comprises a multi-port, thin-film filter having a plurality of filter elements, each of the plurality of filter elements being transmissive with respect to selected wavelengths and reflective with respect to other selected wavelengths.

8. A method of upgrading the capacity of a wavelength division multiplexed (WDM) network, the WDM network including a first WDM system in an existing configuration comprising a first transmit terminal node, at least a first optical amplifier, and a first receive terminal node coupled via a first optical fiber, wherein the first WDM system transports a first WDM signal comprising a plurality of optical channels of different wavelengths in a first wavelength band, the method comprising:

while maintaining service in the first WDM system using the existing configuration, coupling at least a second WDM system to the first optical fiber to transport a second WDM signal comprising a second plurality of optical channels of different wavelengths in a second wavelength band, the second WDM system comprising a second transmit terminal node, at least a second optical amplifier, and a second receive terminal node so that the second WDM signal is transported along with the first WDM signal in the first optical fiber; and processing the first and second WDM signals at a prescribed location along the first optical fiber by receiving the first and second WDM signals in the first optical fiber, splitting the first and second WDM signals as a function of the first and second wavelength bands so that the first WDM signal is amplified by the first optical amplifier in the existing configuration and so that the second WDM signal is routed to and separately amplified by the second optical amplifier, and recombining the first and second amplified WDM signals for transmission along the first optical fiber, wherein the first and second WDM systems are separate systems operating simultaneously over the first optical fiber and wherein the capacity of the WDM network is upgraded to carry both the first and second WDM signals while maintaining service in the first WDM system using components in the existing configuration.

9. The method according to claim 8, wherein the first and second wavelength bands include a guard band therebetween.

10. The method according to claim 8, wherein the step of splitting further comprises separately filtering a supervisory optical channel associated with the first WDM system and a supervisory optical channel associated with the second WDM system so that existing supervisory functions of the first WDM system are separately maintained according to the existing configuration.

* * * * *